Sept. 25, 1923.  R. MATSUSHITA  1,469,166
HOT PLATE
Filed May 20, 1921   2 Sheets-Sheet 1

R. MATSUSHITA.
INVENTOR

BY Victor J. Evans
ATTORNEY

WITNESS:

Sept. 25, 1923.  R. MATSUSHITA  1,469,166
HOT PLATE
Filed May 20, 1921    2 Sheets-Sheet 2

Roy Matsushita
INVENTOR

BY Victor J. Evans
ATTORNEY

WITNESS:

Patented Sept. 25, 1923.

1,469,166

UNITED STATES PATENT OFFICE.

ROY MATSUSHITA, OF WILMETTE, ILLINOIS.

HOT PLATE.

Application filed May 20, 1921. Serial No. 471,281.

*To all whom it may concern:*

Be it known that I, ROY MATSUSHITA, a citizen of the United States, residing at Wilmette, in the county of Cook and State of Illinois, have invented new and useful Improvements in Hot Plates, of which the following is a specification.

This invention relates to a hot plate or attachment for gas stoves to facilitate cooking in light housekeeping apartments or for the conservation of fuel when used on gas stoves of approved type.

An object of this invention is to provide a device as specified which is simple in construction and may be manufactured at a low cost, and one by means of which a single burner on a gas stove may be employed for cooking a number of different things.

More specifically, the invention comprehends the provision of a device as specified which comprises a body shell or frame which carries a suitable plate upon its upper surface upon which pancakes may be cooked, bread toasted or the like providing space for a plurality of cakes or slices of bread, or, if desired, for a plurality of containers for holding various edibles, as well as one which may be utilized for broiling steak or analogous cooking uses.

Other objects of the invention will appear in the following detailed description and in the accompanying drawings wherein.

Figure 1:
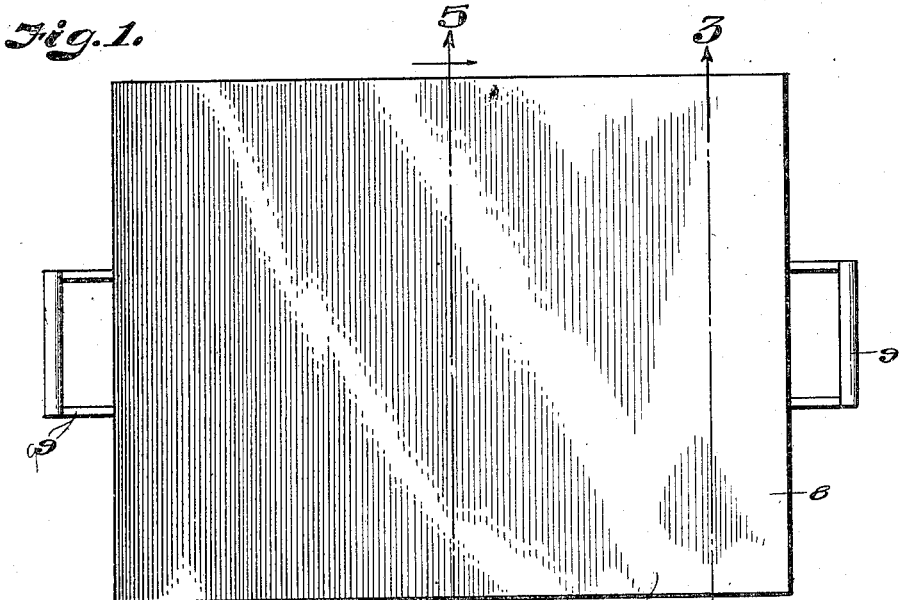
Fig. 1 is a top plan of the improved hot plate structure.
Figure 2:
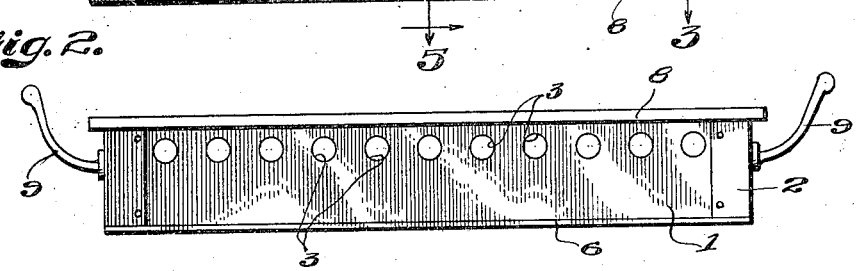
Fig. 2 is a side elevation of the improved hot plate structure.
Figure 3:
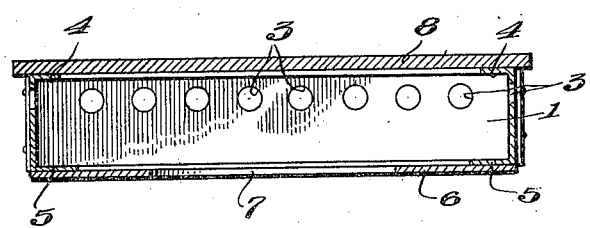
Fig. 3 is a cross section taken on the line 3—3 of Fig. 1.
Figure 4:
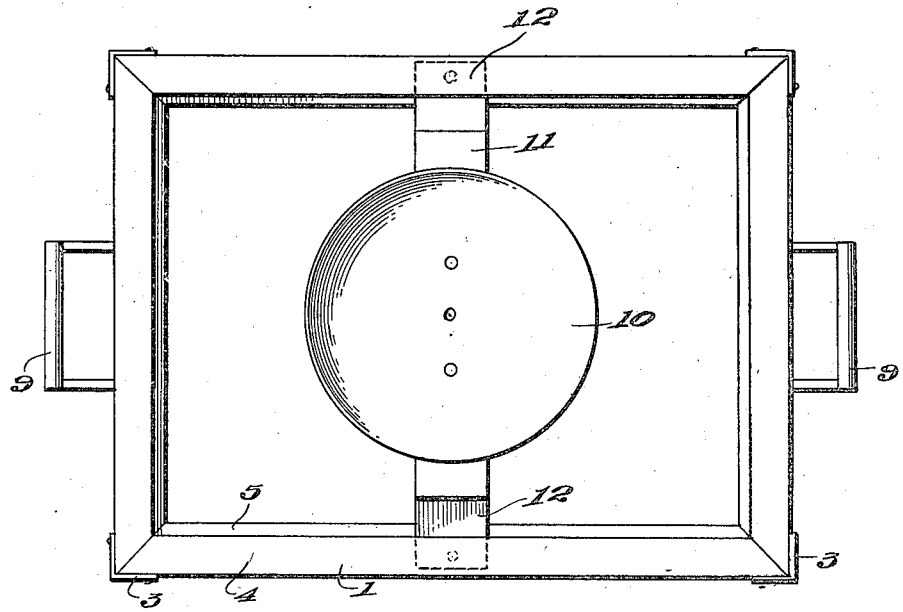
Fig. 4 is a top plan of the improved hot plate having the cooking plate removed and illustrating the baffle or heat deflecting plate.
Figure 5:
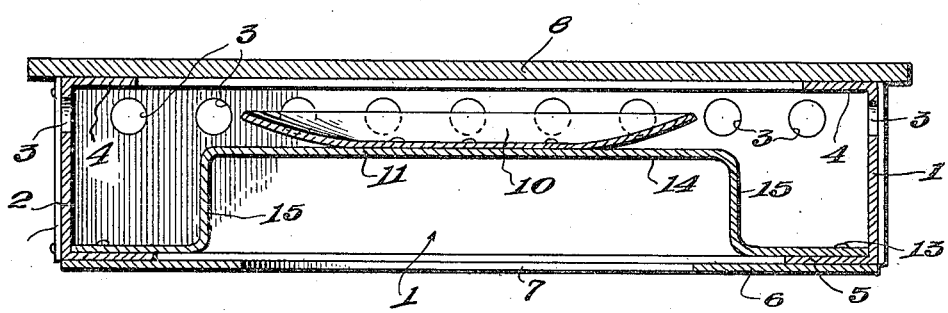
Fig. 5 is a cross section taken on the line 5—5 of Fig. 1.

Referring more particularly to the drawing the improved hot plate comprises a rectangular frame 1 which is constructed of sheet metal or analogous material and is reinforced at the corners as at 2, the sides of which are provided with a plurality of openings 3 to permit the escape of gas therefrom.

The upper and lower edges of the sides of the rectangular frame 1 are bent transversely to the sides providing substantially rectangular ledges 4 and 5. When in use, the frame 1 is adapted to rest upon a bottom plate 6 which is provided with a central opening 7 of sufficient size to fit about a burner of a gas stove and permit the heat from the burner to be directed into the frame 1 and against the under surface of a baffle or heat distributing plate 10 which causes distribution of the heat over the outer portions of the cooking plate 8 for cooking purposes and preventing waste of the heat by atmospheric diffusion. The griddle or cooking plate 8 is mounted upon the upper ledge 4 and projects beyond the edges of the frame 1, the said plate being adapted to hold griddle cakes while cooking, bread for toasting, or steak may be broiled thereon. If desired the plate 8 may be used to support a number of cooking utensils thereby permitting cooking of a number of articles by a single burner on a gas stove resulting in the consequent saving of fuel. Handles 9 are attached to each end of the frame 1 to facilitate its movement.

The concavo convex heat diffusing disc or plate 10 is supported above the bottom 6 and lower ledge 5 of the frame 1 by a suitable support 11 formed of strip metal and bent to provide attaching portions 12 which rest upon the ledge 5 and are attached thereto by rivets or suitable attaching means 13. The support 11 further includes the disc supporting portion 14 which is connected to the attaching portions 12 by the upright portions 15 so that the disc 10 will be supported with its concave surface upwardly adjacent to the under surface of the cooking plate 8 so that the heat or fire entering the frame 1 through the opening 7 will be deflected by the plate 10 about the outer portions of the cooking plate. The heat will, in a short time thoroughly heat the baffle plate 10 and the plate 8 will have its substantially concavo convex portion properly heated by the heat which passes through the plate 10 after it becomes thoroughly heated.

It is, of course, to be understood that the invention may be constructed in various other manners and the parts associated in different relations and, therefore I do not desire to be limited in any manner except as set forth in the claim hereunto appended.

Having thus described my invention what I claim is:—

In a hot plate, a frame provided with upper and lower ledges, a cooking plate supported on said upper ledge, a bottom plate beneath said frame and provided with a heat entrance opening, said frame provided with a plurality of escape openings, a concavo convex baffle plate within said frame for distributing heat over said cooking plate, supporting means for said baffle plate comprising a substantially U shaped frame attached to said lower ledge, and handles carried by said frame.

In testimony whereof I affix my signature.

ROY MATSUSHITA.